(No Model.)　　　　　　　　　　　　　　　　　　　　5 Sheets—Sheet 1.

F. H. RICHARDS.
WEIGHING MACHINE.

No. 585,967.　　　　　　　　　　　　　Patented July 6, 1897.

Fig. 1.

Witnesses　　　　　　　　　　　　　　　　　　Inventor.

(No Model.)  F. H. RICHARDS.  5 Sheets—Sheet 2.
WEIGHING MACHINE.

No. 585,967.  Patented July 6, 1897.

Witnesses  Inventor (No Model.)  F. H. RICHARDS.  5 Sheets—Sheet 3.
WEIGHING MACHINE.

No. 585,967.  Patented July 6, 1897.

Fig. 5.

Witnesses:
Chas. F. Schmelz
Fred. J. Dole.

Inventor:
F. H. Richards.

(No Model.)  F. H. RICHARDS.  5 Sheets—Sheet 5.
WEIGHING MACHINE.

No. 585,967.  Patented July 6, 1897.

Witnesses  Inventor.

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,967, dated July 6, 1897.

Application filed October 30, 1896. Serial No. 610,610. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, an object of the invention being to provide an improved organization of mechanism primarily intended for use in connection with a stream-controller or valve and its variable-efficiency-actuating means and which comprehends modifying multiplex linkage coöperative, respectively, with said stream-controller and its actuating means and operable for regulating the transmission of force to the stream-controller or valve, and consequently by reaction to the weighing mechanism, such force being at the initial stage of the weighing operation approximately or nearly at its maximum efficiency and progressively decreasing up to the drip period, at which time it is at its minimum, whereby during this stage the most potent load-vitiating factor is almost wholly removed, it being practically extinct, so that the partial load in the load-receiver may be completed or poised with great accuracy, the multiplex linkage being also operable at the close of the drip period or on the completion of the predetermined load for transmitting a quick action to the stream-controller to thereby intercept the supply of material to the load-receiver and for also starting in operation the mechanism for effecting the discharge of the weighed load.

A further object is to combine with a hopper a stream-controller or valve therefor and an actuator for said stream-controller or valve, a thrust-transferring member normally coöperative with the valve and said actuator, shifting means for throwing said thrust-transferring member out of operative relation with said actuator, and instrumentalities for blocking the valve-opening movement of said thrust-transferring member when it is thus shifted, so that, as will be understood, the operation of the machine can be arrested or interrupted at will and the opening of the valve thereby positively precluded. If desirable, a suitable lock may be used to lock the parts in such shifting positions to prevent maliciously-disposed persons from tampering with the same.

In connection with the shifting means it is also an object to provide a poise-weight, which is normally added to the weighing mechanism, but which is to be subtracted therefrom when a test is to be made, and for attaining this end said poise-weight will be preferably under the control of the shifting means for said thrust-transferring member, whereby the two parts may be simultaneously shifted or thrown into their ineffective positions, respectively.

In the drawings accompanying and forming part of this specification, Fig. 5$^a$ is a detail view of the stream-controller-actuating means in a position corresponding with Fig. 5. Figs. 6 and 7 are similar views of the upper part of the machine with the bucket removed and illustrate more especially the valve mechanism, its actuating means, and interposed linkage, the respective parts being shown in the positions occupied thereby at the commencement and close, respectively, of the poising or drip-supply period.

Similar characters designate like parts in all the figures of the drawings.

The framework for supporting the operative parts of the machine may be of any suitable character, and in the form thereof herein shown it consists of the chambered base 2, into which the loads of material from the load-receiver or bucket are intermittently discharged, the end frames or standards 3 and 4, rising therefrom, and the top plate 5, which joins said end frames, said top plate carrying a supply-chute H, which may be cast integral therewith and which contains the mass of material to be weighed.

The weighing mechanism, which is similar in operation to that disclosed by Letters Patent No. 548,840, granted to me October 29, 1895, to which reference may be had, includes a bucket and a scale-beam, designated, respectively, by G and B.)

The scale-beam B is pivotally mounted on the base 2 and consists of a pair of parallel arms joined by the counterweight W, which latter, when the machine is at rest, is borne by suitable supports extending from the base 2. The two arms of the scale-beam near the inner ends thereof will be furnished with knife-edges on which rest notched bearings connected to the bucket G at opposite sides thereof in the manner set forth in my said Letters Patent.

The bucket G will have the usual discharge outlet or orifice, and for controlling the same the load-discharge member or closer L is employed, it being in the form of an approximately flat plate contiguous to the lower edge of the bucket G when in its normal position, said closer also being preferably counterweighted, as is customary, for shutting it on the discharge of a weighed bucket-load.

Figure 1:
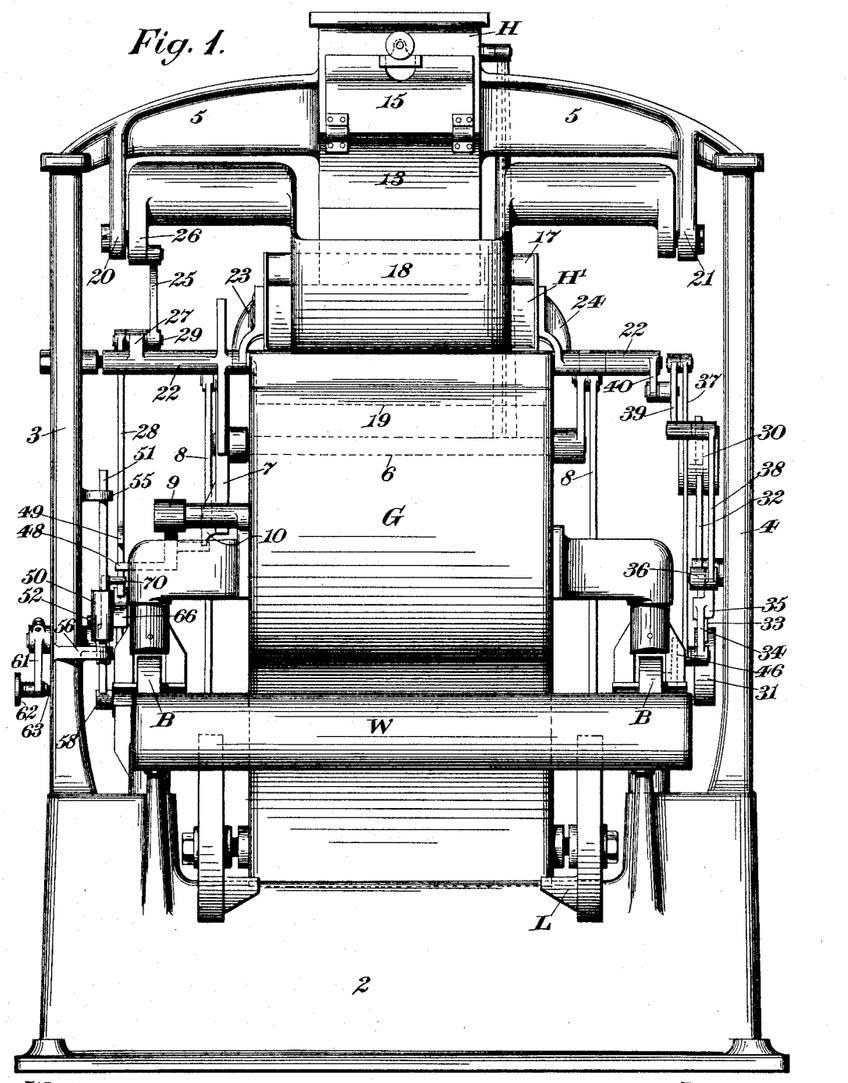
Figure 1 is a front elevation of a weighing-machine including my present improvements.
Figures 2, 3, 4:
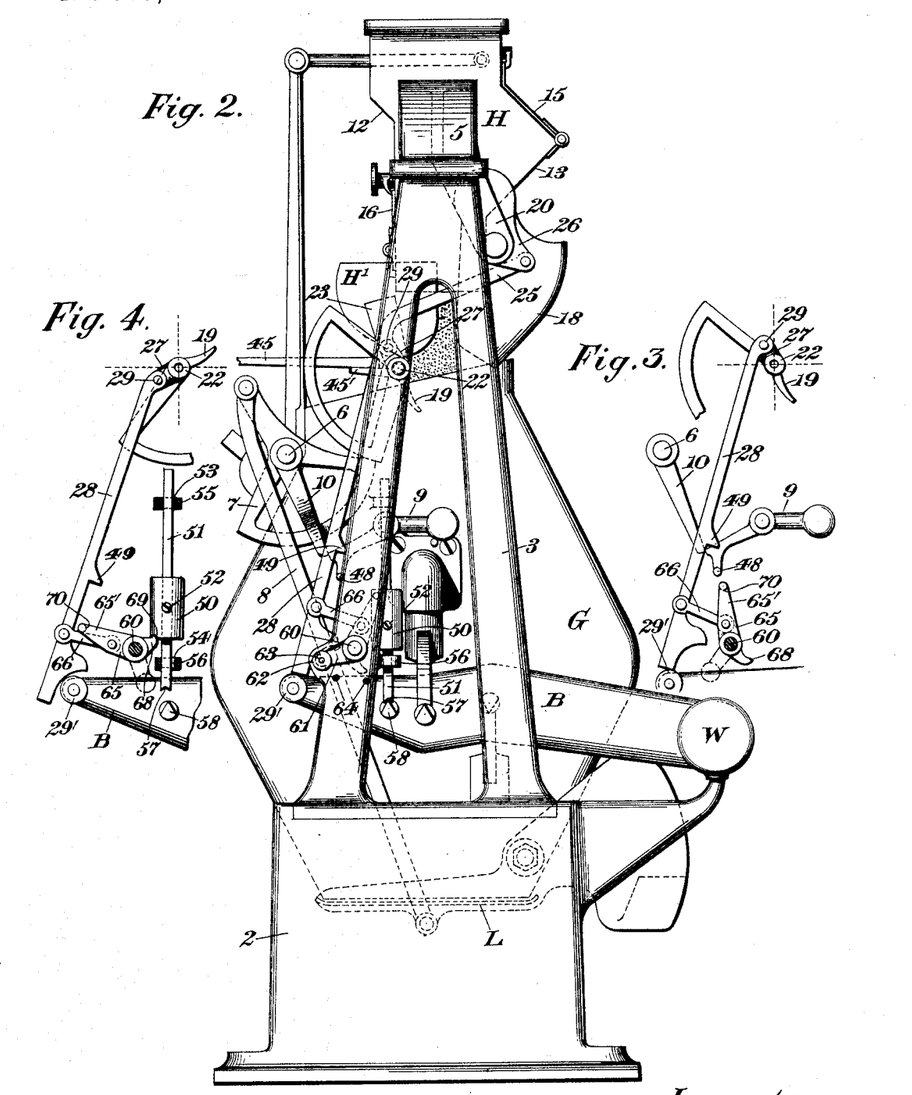
Fig. 2 is an end elevation, as seen from the left in Fig. 1, the parts being in the same positions as in said figure and as they are at the commencement of operation.
Figs. 3 and 4 are detail views of the shifting means for the poise-weight and valve-opening thrust-rod.

The bucket G is illustrated carrying the rock-shaft 6, to one end of which is rigidly attached the rocker 7, said rocker having jointed thereto the rod 8, which is likewise attached to the closer L, the rock-shaft 6 being furnished at the opposite end with a crank-arm, which is connected by a similar rod to the opposite side of the closer. The rocker 7 and connecting-rod 8 constitute an inverted toggle, so that when the rocker is engaged by a suitable restraining device the closer will be held against movement by a minimum expenditure of power. For thus holding the rocker 7 against oscillation and for also preventing the opening of the closer L during the load-supply period a counterweighted latch is illustrated at 9, it being pivotally supported on the bucket G and also swinging upward to engage the arm 10 of the rocker 7, as illustrated in Fig. 2.

The supply hopper or chute H, which is in the nature of a main supply device, is of peculiar construction, it comprehending means for governing the motion of the gravitating mass after it enters said hopper, so that the momentum of said moving mass may be checked or retarded and therefore will neither interfere with the successful operation of the valve mechanism nor affect the free passage of the supply to the load-receiver or bucket G. These results I accomplish by the interposition into the path of flow of the supply-stream of oppositely directive or disposed stream-brakes or baffle-plates 12 and 13. (See Fig. 5.) The plate 12 extends within the interior of the chute for some distance, and hence breaks the direct or vertical fall of the material, so that such material cannot drop directly against the discharge edge of the valve, which is an important function, such plate 12 changing the course of the material and delivering it against the companion plate 13, which further breaks the force of impact of the downflowing stream, the plate 13, by reasons of its opposite inclination, tending in conjunction with a suitable stream-controller or valve to direct or deliver the material toward the auxiliary hopper H', the floor or bottom of which is on a line approximately conforming to the angle of repose of the material to be weighed, so that such material may readily gravitate from said hopper.

The main chute or hopper H will have openings at intervals in its walls, which are closed by the doors 15 and 16, said doors being hinged, respectively, adjacent to the lower edges of the two openings and being held in their shut positions by suitable latching means. By opening either one of the two doors access may be had to the interior of the chute or hopper for the removal of sticks or other foreign substances generally found in bodies of granular material and which tend to block or clog the valve mechanism.

The opposite walls of the supplemental hopper H' will be joined by a transverse bar 17, which is suitably attached to a rear wall of the chute H and which constitutes a convenient means for sustaining the said hopper.

The valve mechanism in the form shown includes a pair of stream-controllers or coacting valves 18 and 19, the valve 18 constituting a main or reducing valve and the valve 19 being in the nature of a supplemental or cut-off valve for cutting off and holding back the last part of the stream.

Figure 5:
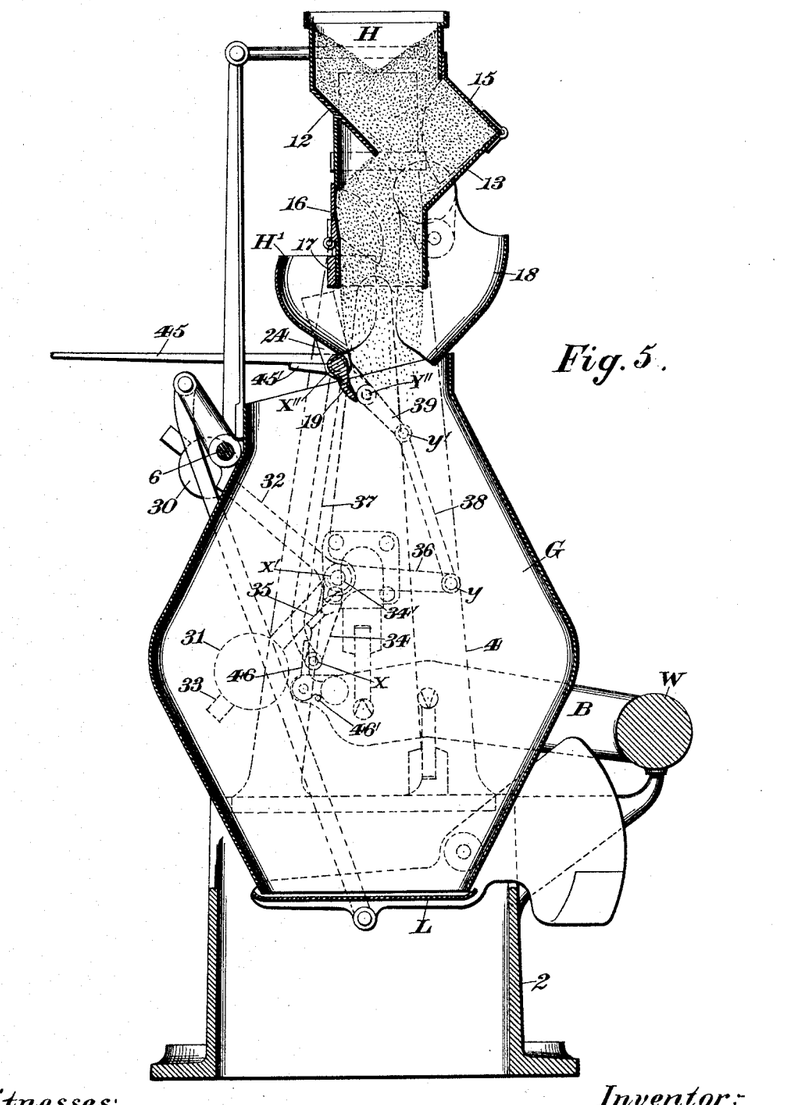
Fig. 5 is a central vertical longitudinal section of the machine.
Figures 5A, 6, 7:
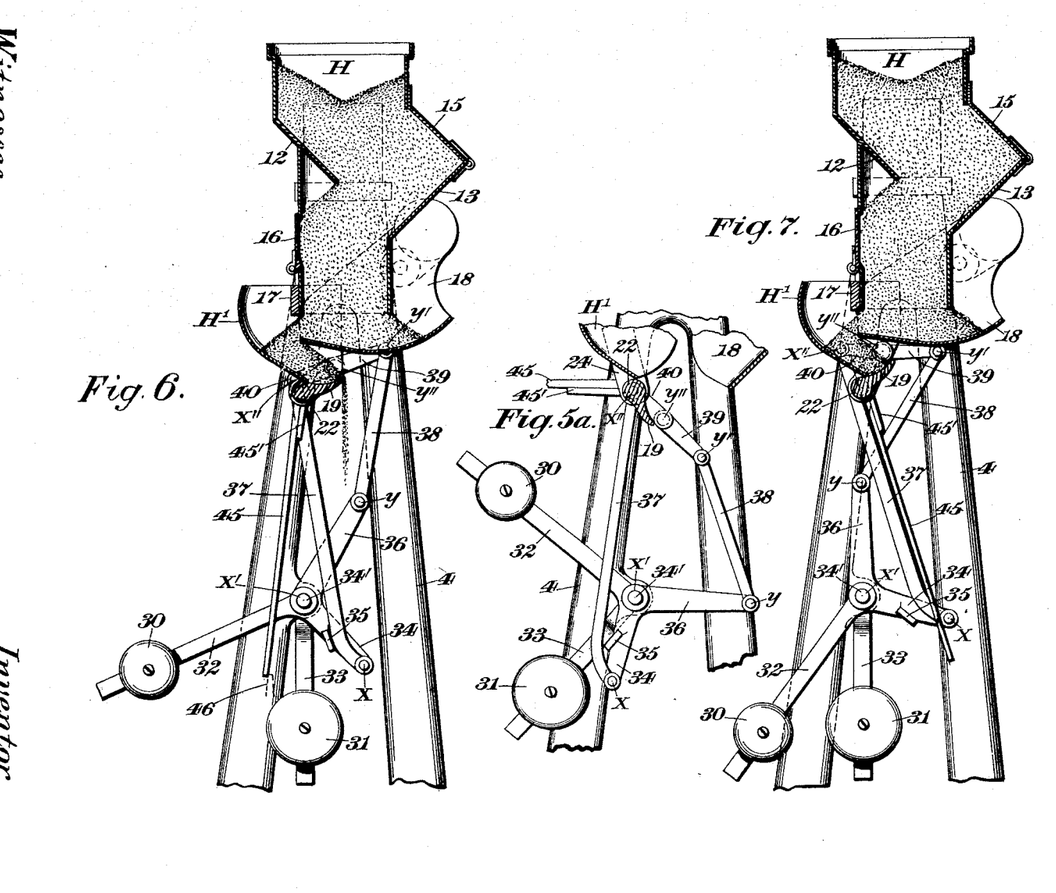

The main stream-controller or valve 18 is of the oscillatory type, it being suspended for movement across the supply-orifice of the hopper H and being shown in its wide-open position in Fig. 5 and in its intermediate position in Fig. 6, it having when in said last-mentioned position nearly stopped the flow of the supply-stream. During its initial movement the valve will slowly or gradually reduce the volume of the supply-stream, and when it has passed a certain point it will deliver the mass to the floor of the supplemental hopper H', from whence it passes or drops into the bucket G.

At the commencement of the poising period the stream supplied to the bucket will be a very small one, its purpose being to complete the partial load already in the bucket. On the completion of the bucket-load the supplemental or cut-off valve will be given an accelerated or final movement for rapidly intercepting the drip-stream. The main valve 18 is pivotally suspended between the arms 20 and 21, which depend from the top plate 5, said valve being connected to the supplemental valve 19 or some part thereof for opening and closing movement, the same instrumentalities being used for operating both valves.

The supplemental valve 19 is in the form of a slightly-curved blade supported contiguous to the discharge edge of the auxiliary hopper H', it being preferably integral with the shaft 22, which is supported by the brackets 23 and 24 on the auxiliary hopper H', said shaft 22 also having an opening in one end for receiving a suitable journal carried by the framework of the machine.

In all automatic weighing-machines with which I am familiar it is necessary to govern the action of the valve or stream-controller from and by the weighing mechanism, the power of the stream-controller-actuating means being applied by reaction to the weighing mechanism—that is to say, indirectly through the intermediate stream-controller—and where the power or pressure applied to the valve or stream-controller is spasmodic or irregular the accuracy of the work will be naturally impaired. The main object, therefore, of my invention is the provision of instrumentalities for regulating the transmission of force from the actuating means to the stream-controller, such force being so transmitted that it is at its maximum intensity at the commencement of the weighing operation and is of progressively-decreasing effect up to a certain stage, where it becomes practically inert.

For obtaining the necessary progressive variation or decrease in force I employ linkage of multiplex character for regulating the transmission of the force, the component parts of which are so connected and operable that the force transmitted to the steam-controller by its variable-efficiency means will be a gradually-decreasing one up to the drip period, when, as is understood, the load is nearly completed. At this point the advancing movement or progress of the valve is momentarily or temporarily interrupted to permit the passage to the bucket of the drip or attenuated stream for completing the partial load therein. During this drip or poising period, as has been stated, the force applied to the valve, and by reaction indirectly to the weighing mechanism, is inappreciable, it being practically taken up or compensated for by the regulating or modifying linkage, so that there is no factor present that will tend to affect the accuracy of the load, the weighing-machine practically being at rest, so that correct work, equal to that of hand-weighing, may be accomplished.

The valves 18 and 19, as hereinbefore stated, are operatively connected, the link 25, which is pivoted, respectively, to the lug 26 of the valve 18 and to the lug 27 of the cut-off-valve shaft 22, being illustrated for this purpose.

A thrust-transferring member is illustrated at 28 pivotally connected with the crank-arm or lug 27 on the shaft 22, the pivot 29 serving to unite the member 28 with said lug 27. The thrust-transferring member, which is in the form of a reciprocatory rod, serves a dual function, one of its purposes being to transmit a thrust to the two valves 18 and 19 from the valve-opening actuator and the other for limiting or checking the closure of the two valves by the valve-closing mechanism or means. The free end of the thrust-rod 28 bears against the scale-beam B, which, as is understood, constitutes a part of the weighing mechanism, so that the power applied to the two valves in closing is directed against the weighing mechanism, and it is the aim of my invention to regulate or modify and decrease this power.

For opening the two valves I employ the scale-beam B, although other means may be used.

When the weighing mechanism has nearly reached the end of its descending stroke, the progress of the valves will be momentarily intercepted, at which time the drip-stream will be supplied to the bucket and the scale-beam will fall away from the thrust-rod 28 as the latter is held with the two valves. At the conclusion of the weighing operation, when the valves are given a swift closing movement, the rod 28 will be forced proportionately rapidly downward into engagement with the beam B or the projection or roll 29' thereon, and during this movement the latch 9 will be tripped, as will hereinafter appear. On the discharge of the load the bucket and beam will rise, and the beam being against the rod 28 will elevate or raise said rod and consequently force the two valves open.

For actuating the operatively-connected valves 18 and 19 to close the same I have illustrated two weights 30 and 31, said weights being preferably adjustable along the arms of the two valve-closing levers 32 and 33, and together with said levers constituting variable-efficiency-actuating means, and being held in fixed positions thereon by suitable means, such as set-screws. The two levers will be pivotaly supported by the framing of the machine, the lever 32 being provided at its inner end with a pair of arms for a purpose that will hereinafter appear, and both levers will also be movable about a common axis, the pivot-pin 34', which extends inward from the frame 4, constituting a convenient means for supporting said levers, the two levers being loose on said pin. The two levers will have a movement in unison and will exert their forces simultaneously during a certain period or until the lever 33 reaches a perpendicular position, at which time it becomes ineffective and hangs suspended and idle on the pivot-pin 34'. The companion lever 32, however, which is connected to the valve mechanism by multiplex linkage, will have a continued effective movement beyond this point, its power, however, decreasing, although it is operable for transferring to the valve mechanism at a certain time an accelerated or multiplied force through the intermediate linkage, whereby the two valves will be quickly closed for stopping the supply of material to the bucket.

The arm 34 of the valve-closing lever 32 is provided with a lug or projection 35, against which the coöperating lever 33 is adapted to bear during the initial period of operation of the machine, so that the power of the last-mentioned lever, as is apparent, augments or increases that of the other, the two levers conjunctively forming in effect a duplex or compound lever of variable efficiency. The arms 34 and 36 of the lever 32 will be connected by the links 37 and 38 to the rocking link 39, the respective joints being pivotal ones, said link 39 being in turn pivoted to the crank-arm 40 of the cut-off-valve shaft 22.

Fig. 2 represents the positions occupied by the various parts at the commencement of operation, the valves 18 and 19 both being in their wide-open positions to permit the unobstructed passage of the supply-stream into the empty bucket G, and the thrust-rod 28, which is connected to the crank-arm 27 on the cut-off-valve shaft 22, will be in contact with the poising side of the beam B. This being the case the supply-stream will gravitate into the bucket, and when a certain proportion of the load has been received said bucket and its supporting scale-beam B will descend, and the latter, moving away from the rod 28, will permit the closure of the two valves by the weighted levers 32 and 33, which drop and act on the valves through the interposed multiplex linkage.

Figure 8:
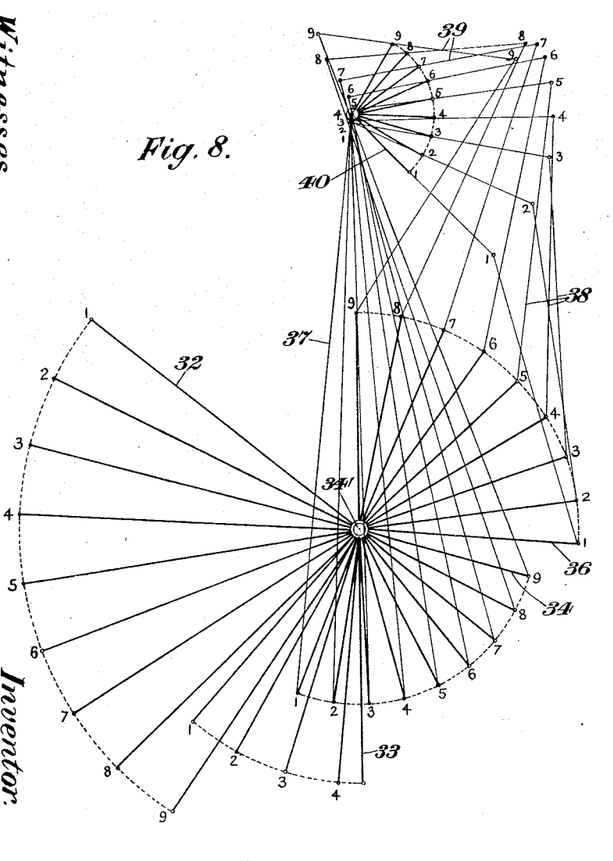
Figs. 8 and 9 are diagrammatic views, and illustrate, respectively, the paths of movement of the valve-actuating means and multiplex linkage and the lines of the various forces transmitted by said parts.

The diagrammatic view Fig. 8 indicates the paths of movement of the two weighted levers 32 and 33, the links 37, 38, and 39, and the crank-arm 40, which is connected to the last-mentioned link, and which extends from the cut-off-valve shaft 22.

On reference again to Fig. 5, where the two weighted levers 32 and 33 are in their primary positions, at which time they have their highest efficiency, it will be seen that the pivotal points $x$ and $x''$ are slightly to the left of a vertical line intersecting the dead-center of said pivotal points, and that the pivotal point $y'$ is slightly to the right of a straight line passing through the dead-center of the points $y$, $y'$, and $y''$, the positions of the foregoing parts at the start corresponding with the positions marked 1 on the diagrammatic view Fig. 8.

The partially-loaded bucket G, as has been specified, will descend with the beam B, thereby permitting the closure of the valves by the dropping or falling of the two levers 32 and 33, acting through the intermediate connections.

As the two levers, which act as one, drop the link 37, which is pivoted to the lever-arm 34, will be swung slowly downward and to the right, thereby approaching the vertical line mentioned. During this movement of the link and levers the two pivots or centers $x$ and $x'$ will have moved very slightly, in fact an inappreciable distance, so that the point $x''$ will act as a fulcrum for the link 39, said point $x''$ being also coincident with the axis of movement of the valve 19 and receiving the thrust of the two levers 32 and 33 through the intermediate link 38, which thrust is transferred by reaction to the point $x$.

With respect to the link 38, as the two levers move in the manner alluded to said link will be oscillated to the right and simultaneously lifted and the pivotal point or knuckle $y'$ will be further broken or thrown beyond the dead-center, whereby, as said link 38 is thus lifted, the connected link 39 will be also elevated or raised, and the pivotal point $x''$, being substantially stationary, the crank-arm 40 on the cut-off-valve shaft 22 will be elevated, thereby rocking said shaft, the valve 19 being moved in a corresponding direction or closed.

The several series of radial lines composing the quadrants in Fig. 8, and which emanate from the point $x'$, which is the center of oscillation of the levers 32 and 33, indicate, as will be understood, the path or degree of movement of the lever 32 from the start to the close of a weighing operation, the series of radial lines composing the partial quadrant illustrating the amount of swing possessed by the lever 33, its arc of oscillation being but half that of the companion lever, said lever 33 losing its effect when it reaches a perpendicular line, although beyond this point in the operation the companion lever 32 has an advancing effective movement, and during this stage of the operation the progress of the valve mechanism will be momentarily arrested or interrupted to obtain a true poised load.

As the two levers 32 and 33 drop from their primary positions (shown in Fig. 5) they transfer their combined action to the two valves 18 and 19 through the interposed linkage for closing the same, and starting with the commencement of operation the link 38 will gradually lose its efficiency, while its mate 37 increases in efficiency, though at a subsequent point in the operation of the machine they are adapted for transmitting to the valve or valves a multiplied action simultaneously, and it is at the point of transition from one degree of power to the other in the travel or stroke of the two links that the valve mechanism will be held to permit the drip-stream to enter the bucket, it being understood that the thrust directed against the two valves at this point is at its minimum, so that the weighing mechanism will be practically free of all outside or extraneous influences, prior to which, however, as will be understood, a progressively-decreasing effect has been exerted thereon through the weighted levers and the operative connections between the same and the scale-beam B.

At the commencement of the poising period, as indicated in Fig. 6, the link 37 will have crossed the vertical line passing through the points $x$ $x'$ $x''$, and the lever-arm 36 and the link 38, the last two parts constituting a toggle, are adjacent to and in the act of approaching a straight line intersecting the points $x$ and $y'$, the movements of the two levers and the connected links up to this time being indicated clearly by Fig. 8.

For holding the valve or valves I may conveniently employ the following means, which involves a properly-positioned stop on the weighing mechanism adapted to engage a coacting member operative and oscillatory with the shaft 22, and hence with the cut-off valve 19. The cut-off-valve shaft 22 is furnished with the rigid extension 45', to which is suitably attached the rod 45. One of the arms of the scale-beam B on the poising side thereof carries a by-pass stop 46, it consisting of a counterweighted lever, the weighted arm of which normally rests on a pin or stud 46', extending from the scale-beam. (See Fig. 5.) This by-pass stop is disposed in the path of movement of the rod 45, so that at the commencement of the poising period it may engage the free end of said rod as it swings with the shaft 22 during the closure of the valve 19, the pin 46' blocking the oscillation of the by-pass 46, so that it becomes substantially a fixture on said beam, and this is the only point during the poising period at which any extraneous force is exerted on the weighing mechanism, the pressure on the by-pass being not only slight but a lateral one and not direct.

When the beam goes below the so-called "poising-line," which indicates the completion of a bucket-load, the by-pass stop 46 will descend therewith and below the arc of oscillation of the rod 45, thereby releasing said rod, and consequently the two valves 18 and 19, so that they may be given their final movements.

It will be apparent that as the two valves open the stroke of the rod 45 will be a reversal of that just specified and as it resumes its normal position it will strike the upper arm of the by-pass 46 and swing the latter ineffectively about its pivot.

Let it be assumed that the descending action of the scale-beam B has released the rod 45, and by referring to the diagram Fig. 8 and to the point 6 in the travel of the two lever-arms 34 and 36—it being remembered that three pivot-points $x'$, $y$, and $y'$ are nearly in alinement—it will be seen that the center $x$ moves from the point 6 to the point 9 on its quadrant and that the link 37 will be elevated a considerable distance, although the elevation of the link 38 as it traverses the last part of its stroke will be a limited one, whereby the pivotal point $y'$ serves as a fulcrum for the link 39, to which last-mentioned link is applied the straight or direct elevating force of the link 37, acting through the lever 32, such force being applied to the valve 19 through the intermediate shaft 22 and crank-arm 40.

As the three pivots of the toggle members 36 and 38 are thrown into line on the final dropping of the lever 32 the result will be a powerful thrust to the valve through the link 39, crank-arm 40, and shaft 22, which is added to the lifting force or power of the link 37 and which is communicated to the rod 28, whereby it will be thrust rapidly downward and into contact with the scale-beam B, which at this time has reached the limit of its descending movement.

Figure 9:
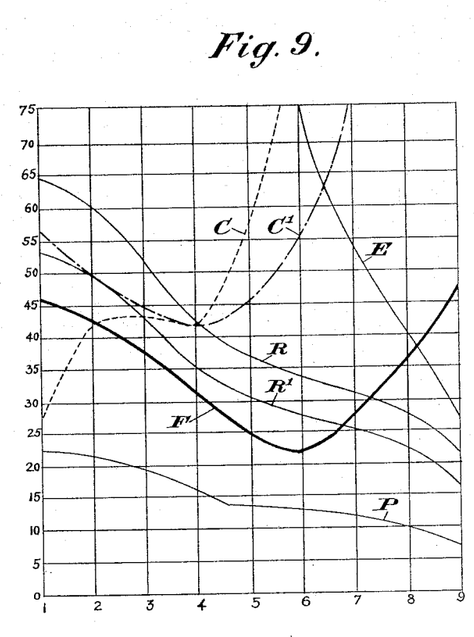

In the diagrammatic view Fig. 9 the horizontal lines indicate or represent arbitrarily, by units, the amounts of force brought into play during the weighing of a load, and the vertical lines indicate intervals of time, such vertical lines agreeing with and being numbered similarly to the radial lines in Fig. 8.

The lowermost wave-line (marked P in Fig. 9) represents the amount of leverage or power exerted on the multiplex-linkage connection, and through it to the valve mechanism, by the two levers 32 and 33 as they drop, the effect of said levers being a progressively-decreasing one up to a certain point, at which time the effect of one lever ceases entirely, the effect of the other lever continuing beyond this point, but diminishing.

The heavy line F indicates the power applied to the valve-shaft 22 by the two levers through the intermediate linkage connection, it becoming less gradual up to the drip period, which corresponds to the point 6, the lever 33 having in the interim reached the perpendicular. Subsequent to this, however, the thrust applied to the shaft, through the multiplex-linkage connection, is a rapidly-increasing one, whereby the valve 19 may be promptly shut to stop the supply to the bucket on the completion of the load.

The lines R and R' indicate the rotative force applied by the lever-arms 36 and 34 to the links 38 and 37 from the start to the close of a weighing operation, such forces being in a gradually-descending scale, and the dotted lines C and C' indicate, respectively, the force applied to the extremities of the rocking link 39 by the links 37 and 38, such force being an increasing one up to a certain point, remaining for a brief period practically uniform, and then branching and gradually increasing, while the line E represents the great amount of resistance coincident with the poising period at the point $y''$, which rapidly diminishes as the bucket-load approaches completion, whereby, as will be evident, the force applied to the valve mechanism during this period will be properly multiplied.

The diagrammatic illustrations are intended to disclose approximately how a linkage of the general class herein set forth may so combine and resolve the forces exerted by the several parts of the mechanism with relation to each other and as a whole as to properly modify the forces exerted by the linkage element, considered as a unit, upon the weighing mechanism.

It will be understood that the particular forces to be accounted for and the particular relations of these forces will depend upon the specific character of the linkage construction, and that this feature can be varied within bounds, in kind and extent, within the purview of my present invention. The diagrammatic lines in Fig. 9 will, of course, be slightly affected by the balancing, or lack of balancing, in the oscillating parts of the mechanism, and are, therefore, only intended to set forth the general principle and not the specific form of the operation of the linkage which is herein described.

The closer-holding means, it will be remembered, include a latch 9, which is normally in engagement with the arm 10 of the rocker, such latch in the form illustrated having a pin or stud 48, which is disposed in the effective plane of movement of a suitable tripper.

The tripper for the latch is shown at 49, and it consists of a projection on the thrust-rod 28, which, on the final and accelerated downstroke of the thrust-rod and concurrently with the final closure of the valve 19, is adapted to impart a blow to the pin 48 on the latch, thereby tripping said latch and disengaging it from the coöperating arm 10 of the rocker 7. When this takes place, the closer L wlli be free of all restraint, so that it can be instantly forced open by the weight of the load in the bucket G, such load being discharged into the chamber of the supporting-base 2.

In connection with the weighing mechanism I employ a poising or testing weight, which in the form shown is normally added to the poising portion of the weighing mechanism, which includes that part of the scale-beam B located to the left of its fulcrum, and also the bucket G, the counterpoising portion of the weighing mechanism consisting of that part of the scale-beam to the right of its fulcrum.

In automatic weighing-machines it is necessary that the total weight of the bucket mechanism, including the weighed load, should be of such a mass as to carry the bucket and beam down sufficiently far to permit the final closure of the valve and the starting in operation of the instrumentalities which control the load-discharge. The small quantity of material which is in the air at some point between the mass in the bucket and the discharge edge of the cut-off valve must be reckoned as a part of the predetermined load, and this small portion must in the ordinary types of machines be in the bucket before it can be carried down to accomplish the specified results. Now instead of waiting until the whole load is completed I add or apply a poise-weight to the poising side of the beam B, the consequence being that the bucket is carried down without any delay at a point just preceding the completion of the true load, the remainder falling into the bucket at a point immediately before the discharge of the load. When a test is to be made, this weight should be subtracted or removed from the weighing mechanism or the poising side of the beam B, and simultaneously therewith the latch-tripper should be thrown into an inoperative position, thereby preventing the tripping of the latch at a subsequent stage, and at the close of the operation if a correct load be in the bucket it will assume, with the scale-beam, a true equipoised position.

The poise-weight (see Fig. 2) is designated by 50, it being mounted on the upright bar or post 51 for sliding movement, whereby it may be raised or lowered as occasion demands to compensate for any inequalities in the weighing mechanism, a set-screw 52 serving as a suitable means for holding said weight in an adjusted position on its supporting-bar. The vertical weighted bar 51, as will be apparent, is normally added to or bears on the scale-beam B, except at intervals or when a test is to be made, when it is subtracted therefrom or elevated. The bar 51 passes through apertures or openings 53 and 54, formed in the lugs 55 and 56, extending laterally from the end frame 3. (See Figs. 2 and 4.) The aperture 54 is somewhat larger than the aperture 53, the walls of the last mentioned serving as a suitable guide for said bar, while the lower aperture permits a certain amount of free movement, whereby the said bar may be properly centered. The lower end of the bar 51 is notched, as at 57, and is adapted to rest normally on the projecting knife-edge support 58 on the scale-beam B. Said bar having been elevated for the purpose of making a test and being lowered the knife-edge 58 will engage one or the other of the two faces of the notch 57, which acts as a guide, so that said bar may be properly guided onto the said knife-edge to exert its whole weight thereon.

The shifting means for simultaneously shifting the weighted bar 51 from its normal position and for throwing the latch-actuator beyond its effective plane of action in the form illustrated will now be set forth and includes instrumentalities for blocking the valve-opening movement of the thrust-transferring member or rod 28, so that when the parts have reached their final positions they may be locked to thwart malicious attempts of evil-minded persons to tamper with the machine. The end frame 3 has a bearing for supporting the rock-shaft 60, which carries at its outer end the operating crank-arm 61, which has a thumb-piece 62, carrying a pin 63, which may be thrust into any one of the series of recesses 64 formed in said frame. Said shaft 60 carries at its inner end the crank-arm 65, which is pivoted to the link 66, the latter being similarly attached to the thrust-rod 28 and the crank-arm 65 being extended beyond its pivotal connection with the link 66, as at 65', for a purpose that will hereinafter appear, the crank-arm 65 and link 66 constituting two members of a toggle, whereby, when the respective pivots thereof are thrown into line, they will aid in preventing retractive movement of the rod 28.

Attention is invited to Fig. 3, which illustrates the preliminary testing position, to accomplish which the thumb-piece 62 will have been grasped and the pin 63 thereof withdrawn from the recess in which it is seated (see Fig. 2) and the crank-arm 61 will be turned until said pin is opposite the intermediate recess of the series, into which it is then thrust, thereby holding the connected parts in the primary shifted positions. During this movement the crank-arm 61 has traveled from the position indicated in Fig. 2 to that illustrated in Fig. 3, as is apparent, and the crank-arm 65 will have been oppositely swung, the link 66 and thrust-rod being moved in a corresponding direction and the tripper 49 being carried to a point beyond its effective plane of action, although the free end of the rod 28 will be still maintained in engagement with the beam B or the roll 29 thereon, so that the operation of the valve mechanism may be properly governed or regulated.

The hub of the crank-arm 65 is provided with a projecting spur 68, which is adapted to enter a coöperating notch 69 on the under face of the weight 50 on the second and final movement of the shifting means, but during the primary movement it does not come in contact with said weight. The parts being in the positions illustrated in Fig. 3, in which view the weighted bar 51 and its adjuncts are not illustrated, the thumb-piece 62 will be again grasped, the pin 63 withdrawn from the intermediate recess of the series of recesses 64, and the actuating handle or crank 61 will be again turned to the right, it being understood that the bucket-load is complete, thereby oppositely swinging the crank-arm 65, the link 66, and the thrust-rod 28, so that the free end of the latter will be carried out of contact with the roll 29' on the scale-beam B. When the parts have reached the ends of their working strokes, the pin 63 will be thrust into the last of the series of recesses 64, thereby holding said parts in their shifted positions. During the secondary shift the spur 68 will be caused to impinge against the walls of the notch 69, thereby elevating the bar 51, and consequently the weight 50, thereby subtracting the latter from the weighing mechanism. The weighing mechanism is now entirely free from all outside influences at this time and if, as previously stated, a true load be in the bucket it, with the scale-beam, will assume a balanced position.

The extended portion 65' of the crank-arm is provided with the laterally-extending pin 70, which, when the several centers of the parts 65 and 66 are thrown approximately into alinement on the secondary testing position, will be caused to abut against the upper side of the link 66, as illustrated in Fig. 4, and the pin 63 being in the last recess of the series 64 the joint at the point of connection between the parts 65 and 66 cannot possibly be broken, so that the upward or valve-opening thrust of the thrust member 28 is positively guarded against.

The operation of the hereinbefore-described machine, briefly, is as follows: Fig. 2 represents the positions occupied by the various parts at the commencement of operation, the valves 18 and 19 being in their wide-open positions and the closer L shut and maintained in such position by the latch 9, which is in engagement with the arm 10 of the rocker. The valves being open a supply of material will pass from the chute or hopper H and enter the bucket G. When a certain proportion of the load to be weighed has been received by the bucket, it will descend with the scale-beam B, and the latter moving away from the thrust-rod 28, which controls the valves, will permit the closure of said valves by the dropping of the weighted levers 32 and 33, which levers transmit their force through the intermediate links 37, 38, and 39 and crank-arm 40.

At the commencement of the poising period, as illustrated in Fig. 6, the depending rod 45, which oscillates with the cut-off-valve shaft 22, will be carried against the by-pass 46 on the scale-beam B, whereby the progress of the valve mechanism will be momentarily intercepted to permit the drip-stream to pass into the nearly-loaded bucket. When the load is completed, the scale-beam will be caused to descend below the poising-line, thereby releasing the rod 45 and consequently the two valves, so that the latter can be given their final closing movements by the further dropping of the lever 32, acting through the linkage connections. Concurrently with the final closure of the valve the rod 28 will have imparted thereto a rapid downward thrust, whereby the tripper 49 thereon is caused to impinge against the pin 48 of the latch 9 to trip said latch. When the latch is tripped, the closer L will be free of all restraint and will be forced open by the weight of the contents within the bucket G, which are discharged into the chamber of the base 2, and after the load is discharged the parts will be caused to resume their normal positions.

Having described my invention, I claim—

1. The combination, with stream-supplying means, of a stream-controller; variable-efficiency means for advancing the stream-controller; and linkage connected with the stream-controller and the variable-efficiency means, said linkage serving to regulate the action of the stream-controller.

2. The combination, with stream-supplying means, of a stream-controller; variable-efficiency-actuating means for advancing the stream-controller; and a plurality of links jointed together and connected with the stream-controller and its actuating means and serving to regulate the action of the stream-controller on its advancing movement.

3. The combination, with weighing mechanism including a load-receiver, of stream-supplying means; a stream-controller; variable-efficiency-actuating means for advancing said stream-controller; and means located between said actuating means and the stream-controller and operable for decreasing the action of said actuating means up to a certain point and for subsequently increasing said action.

4. The combination, with weighing mechanism including a load-receiver, of stream-supplying means; a stream-controller; variable-efficiency means for advancing said stream-controller; linkage operative with and located between said actuating means and the stream-controller and operable for decreasing the action transmitted to said stream-controller up to a certain point and for subsequently increasing said action; and instrumentalities for arresting the progress of the stream-controller when the power applied thereto is at its minimum.

5. The combination, with weighing mechanism including a load-receiver, of stream-supplying means; a stream-controller supported for opening and closing movements; variable-efficiency means for closing said stream-controller; and linkage located between the stream-controller and its closing means and operable for decreasing the action applied to said stream-controller up to a certain point and for increasing the same subsequently thereto.

6. The combination, with weighing mechanism including a load-receiver, of stream-supplying means; a valve; variable-efficiency means for closing said valve; and linkage cooperative with and located between the valve and its actuating means and operable for progressively decreasing the action applied to the valve up to a certain point and for subsequently increasing the same.

7. The combination, with weighing mechanism including a load-receiver, of stream-supplying means; a pair of connected valves; variable-efficiency means for closing the valves; and linkage located between and connected with one of the valves and the valve-closing means.

8. The combination, with weighing mechanism including a load-receiver, of stream-supplying means; a stream-controller; variable-efficiency means for advancing said stream-controller; linkage located between the stream-controller and its advancing means and operable for decreasing the action applied to the stream-controller up to a certain point and for subsequently increasing the same; a rod connected with said stream-controller; and a stop adapted to engage said rod when the power applied to the stream-controller is at its minimum.

9. The combination, with main and auxiliary hoppers, of main and auxiliary valves supported adjacent to their respective hoppers and connected together for simultaneous operation; variable-efficiency valve-closing means; and linkage located between and connecting said valve-closing means and one of the valves.

10. The combination with stream-supply means, of a stream-controller; and stream-controller-actuating means including a pair of coöperating levers which are loosely mounted; and means for transmitting the combined force of said levers to the stream-controller.

11. The combination with stream-supply means, of a stream-controller; and stream-controller-actuating means including a pair of loosely-mounted levers, one bearing against the other; and means for transmitting the combined force of said levers to the stream-controller.

12. The combination with stream-supply means, of a stream-controller; a pivot-pin; a pair of levers loosely mounted on said pivot-pin, the first-mentioned lever having a lug against which the other is adapted to bear during a certain period of its operation; and means for transmitting the combined force of said levers to the stream-controller.

13. The combination with stream-supply means, of a stream-controller; a link operative with said stream-controller; a pair of links pivoted, respectively, to the opposite extremities of said first-mentioned link; and a lever connected to said pair of links.

14. The combination with stream-supply means, of a stream-controller; a link operative with said stream-controller; a pair of links pivoted to the opposite extremities of said first-mentioned link; and a lever having arms, the said arms being pivoted, respectively, to said pair of links.

15. The combination with stream-supply means, of a stream-controller; a pair of coöperative levers mounted one to have an effective movement beyond the other; and means for transmitting the combined force of said levers to the stream-controller and for also transferring the force of one of said levers to said stream-controller beyond the point at which the other lever becomes ineffective.

16. The combination with stream-supply means, of a stream-controller; a pair of coöperative levers mounted one to have an effective movement beyond the other; and means for regulating the transmission of the combined force of said levers to the stream-controller and for also transferring the force of one of said levers to said stream-controller beyond the point at which the other lever becomes ineffective.

17. The combination with stream-supply means, of a stream-controller; a pair of coöperative levers mounted one to have an effective movement beyond the other; and a linkage connection located between said levers and the stream-controller and operable for regulating the transmission of the combined force of said levers to the stream-controller and for also regulating the transmission of the force of one of said levers to said stream-controller beyond the point at which the other lever becomes ineffective.

18. The combination with a hopper, of a valve and a supporting-shaft therefor provided with a crank-arm; a link pivoted to said crank-arm; a pair of links pivoted, respectively, to the opposite ends of said first-mentioned link; and a weighted lever having arms pivoted, respectively, to said pairs of links.

19. The combination with main and auxiliary hoppers, of main and auxiliary valves, the auxiliary valve being supported by a shaft; a link connecting said shaft with the main valve; a crank-arm on said shaft; a link pivoted to said crank-arm; a pair of links connected to the opposite ends of said last-mentioned link; and a weighted lever having arms pivoted, respectively, to said pair of links.

20. The combination, with weighing mechanism including a load-discharge member; of means comprehending a latch, for normally holding said load-discharge member against movement; stream-supplying means; a stream-controller; variable-efficiency means for advancing said stream-controller; linkage located between the stream-controller-advancing means and the stream-controller; and a tripper for said latch, connected with the stream-controller.

21. The combination, with a load-receiver having a closer; of means including a latch, for normally holding said closer against opening movement; a supporting scale-beam for the load-receiver; a hopper; a valve for said hopper, mounted to open and close; variable-efficiency valve-closing means; linkage located between the valve-closing means and the valve; and a rod connected with said valve and provided with a projection constituting a latch-tripper.

22. The combination with a main hopper, of a main or reducing valve having a movement across the plane of the discharge-orifice of said hopper; an auxiliary hopper having an inclined bottom and adapted to receive a stream of material delivered thereinto by the main or reducing valve; an auxiliary or cut-off valve supported adjacent to the discharge edge of the auxiliary hopper; and valve-actuating means.

23. The combination with a main hopper, of a main or reducing valve having a movement across the plane of the discharge-orifice of said hopper; an auxiliary hopper having an inclined bottom adapted to receive a stream of material delivered thereinto by the main or reducing valve; an auxiliary or cut-off valve supported adjacent to the discharge edge of the auxiliary hopper and operatively connected to the main valve; and valve-actuating means.

24. The combination with a main hopper, of a main or reducing valve having a movement across the plane of the discharge-orifice of said hopper; an auxiliary hopper having an inclined bottom adapted to receive a stream of material delivered thereinto by the main or reducing valve; an auxiliary or cut-off valve supported adjacent to the discharge edge of the auxiliary hopper and operatively connected to the main valve; means for actuating said valves; and force-modifying linkage located between said valves and their actuating means.

25. The combination with a main hopper having therein oppositely-inclined baffle-plates, of a main or reducing valve having a movement across the plane of the discharge-orifice of said hopper; an auxiliary hopper having an inclined bottom adapted to receive a stream of material delivered thereinto by the main or reducing valve; an auxiliary or cut-off valve supported adjacent to the discharge edge of the auxiliary hopper; and valve-acuating means.

26. The combination with a hopper and with a valve, of a valve-opening actuator; a thrust-transferring member normally coöperative with the valve and said actuator; shifting means for throwing said thrust-transferring member out of operative relation with said actuator; and instrumentalities for blocking the valve-opening movement of said thrust-transferring member when it is thus shifted.

27. The combination with a hopper and with a valve, of a valve-opening actuator; a thrust-transferring member normally coöperative with the valve and said actuator; shifting means for throwing said thrust-transferring member out of operative relation with said actuator; and instrumentalities operative with said shifting means, for blocking the valve-opening movement of said thrust-transferring member when it is thus shifted.

28. The combination with a hopper and with a valve, of weighing mechanism including a scale-beam which also constitutes a valve-opening actuator; a thrust-transferring member normally coöperative with the valve and said scale-beam to thereby transmit the thrust of the latter to the valve for opening the same; shifting means for throwing said thrust-transferring member out of operative relation with said scale-beam; and instrumentalities for blocking the valve-opening movement of said thrust-transferring member when it is thus shifted.

29. The combination with a hopper and with a valve, of a valve-opening actuator; a thrust-transferring member normally coöperative with the valve and said actuator; shifting means; a toggle located between said shifting means and said thrust-transferring member and adapted to have its several centers thrown into line by said shifting means to thereby move said thrust-transferring member out of operative relation with said actuator; and means carried by one of the toggle members, for blocking the valve-opening movement of said thrust-transferring member when it is thus shifted.

30. The combination with weighing mechanism including a bucket, of a hopper; a valve; a valve-opening actuator; a thrust-transferring member normally coöperative with the valve and said actuator; a poise-weight normally added to the weighing mechanism;

shifting means for simultaneously throwing said thrust-transferring member out of operative relation with said actuator and for subtracting the poise-weight from the weighing mechanism; and instrumentalities for blocking the valve-opening movement of said thrust-transferring member when it is thus shifted.

31. The combination with weighing mechanism including a load-discharge member, of means comprehending a latch for holding said load-discharge member against movement; a supply-hopper; a valve; a valve-opening actuator; a thrust-transferring member normally coöperative with the valve and said actuator and having a latch-tripper; a poise-weight normally added to the weighing mechanism; shifting means for simultaneously throwing said thrust-transferring member out of operative relation with said actuator and for subtracting the poise-weight from the weighing mechanism; and instrumentalities for blocking the valve-opening movement of said thrust-transferring member when it is thus shifted.

32. The combination, with a scale-beam having a knife-edge, of a bucket supported by said scale-beam; two apertured lugs, one of the apertures of which is larger than the other; a weighted post passing through said apertures and having at its lower end a notch that is positioned to rest on said knife-edge; and means for elevating said post.

33. The combination with weighing mechanism; of two apertured lugs, one of the apertures of which is larger than the other; a weighted post passing through said apertures and normally added to the weighing mechanism; and means for elevating said post.

34. The combination, with weighing mechanism including a load-receiver and with stream-supplying means therefor, said mechanism including a scale-beam provided with a knife-edge; of a series of apertured lugs on the framework of the machine; a weighted vertically-movable post passing through said apertures and having a notch at its lower end that normally rests on said knife-edge; and means for elevating said post.

35. The combination, with weighing mechanism including a load-receiver, of stream-supplying means; a valve supported for opening and closing movements; a plurality of variable-efficiency levers supported for oscillation by the framework; and linkage connected, respectively, with the valve and one of said levers.

FRANCIS H. RICHARDS.

Witnesses:
    FRED. J. DOLE,
    F. N. CHASE.